United States Patent [19]

Roos

[11] 4,157,770
[45] Jun. 12, 1979

[54] WATER GRAVITY PLANT FEEDER

[76] Inventor: Hans W. Roos, 225 Mt. Hope Pl., Bronx, N.Y. 10457

[21] Appl. No.: 823,587

[22] Filed: Aug. 11, 1977

[51] Int. Cl.² .............................................. A01G 27/00
[52] U.S. Cl. .......................................... 222/70; 47/79
[58] Field of Search .......................... 47/48.5, 62, 79; 222/57, 58, 70, 77, 164, 166, 181, 185, 463, 482, 485, 486

[56] References Cited

U.S. PATENT DOCUMENTS

| | | | |
|---|---|---|---|
| 3,168,224 | 2/1965 | Rios | 47/79 X |
| 3,281,015 | 10/1966 | Streb | 222/57 |
| 3,900,134 | 8/1975 | Larson | 47/79 X |
| 4,042,150 | 8/1977 | Roos | 47/79 X |

*Primary Examiner*—David A. Scherbel
*Attorney, Agent, or Firm*—Jacob L. Kollin

[57] ABSTRACT

An improved water gravity plant feeder for use with bottled water or hose connection to a water supply; the water gravity plant feeder comprises a housing, a water bottle mounted on the housing, and a device for supplying water from the bottle to plants arranged adjacent the housing. The watering device comprises an inner feed tray positioned under the water bottle for supplying a measured level of water at intervals to a water trough. When full, water is spilled from the trough into a sump in the housing, whence it flows into a water distributor for watering a plurality of plants. The plant feeder is also provided with mechanism for using water from a water tap.

10 Claims, 9 Drawing Figures

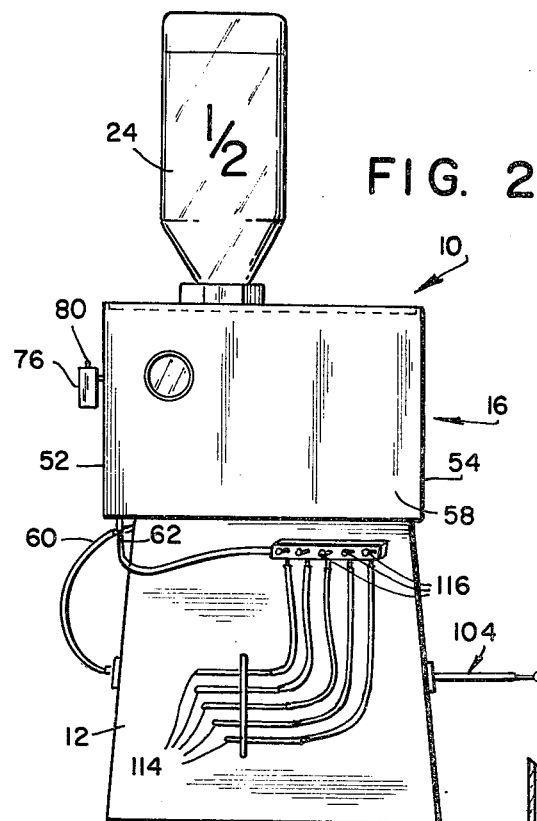
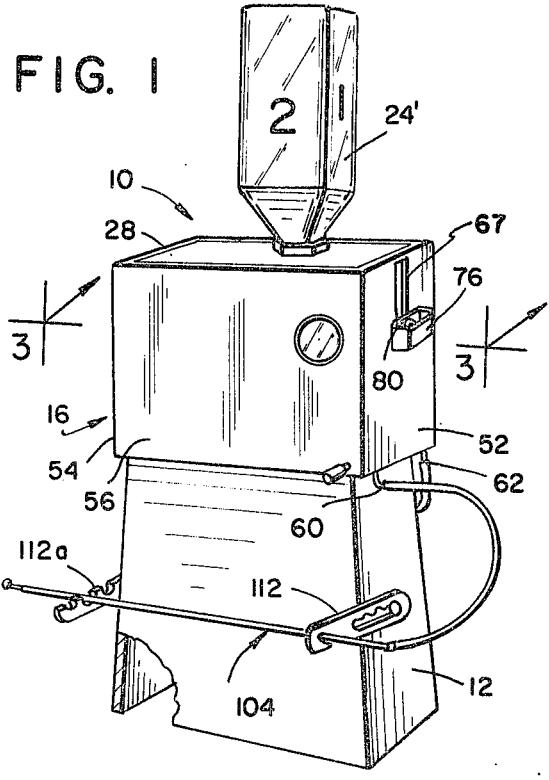
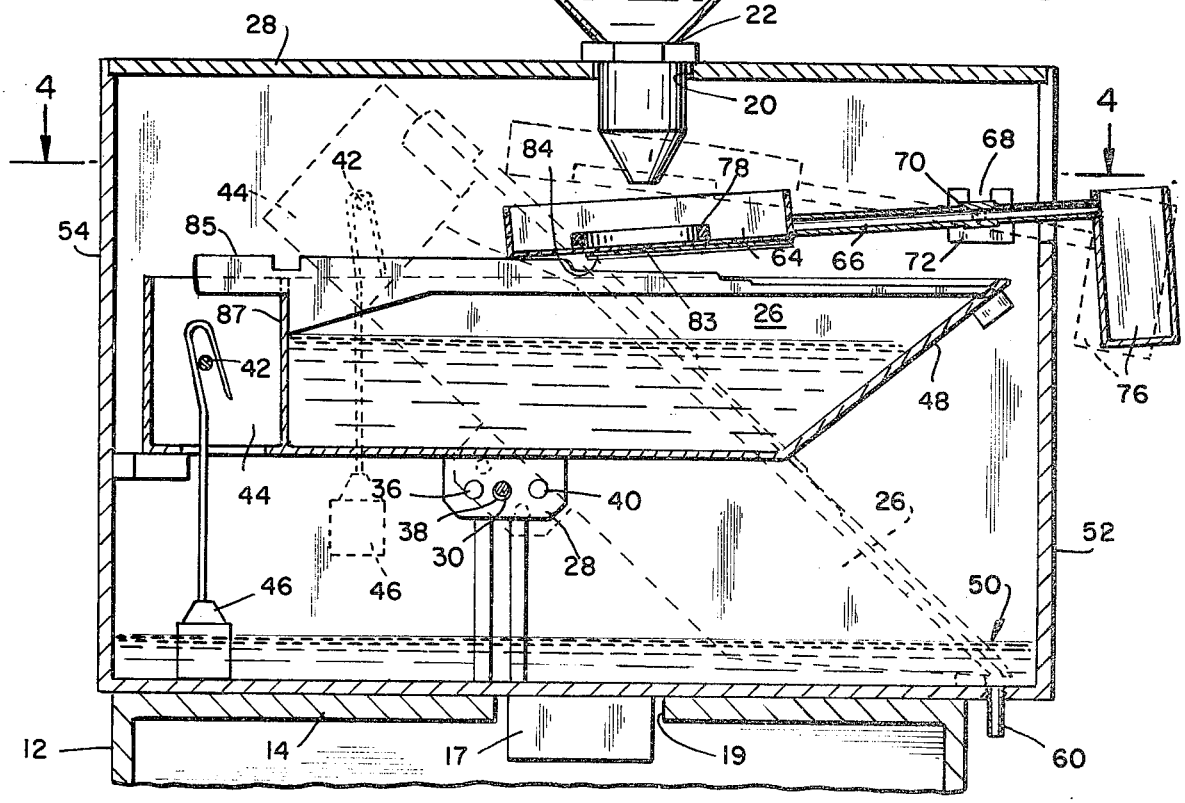

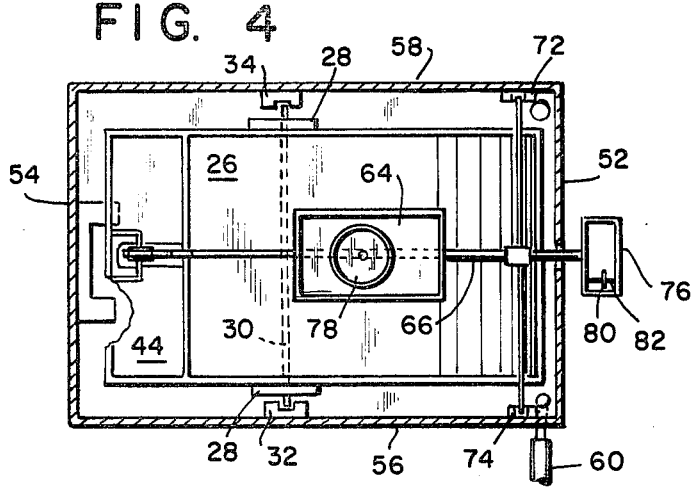
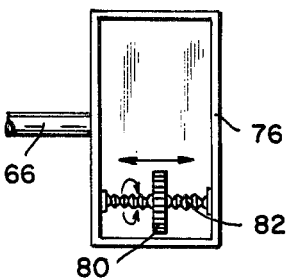
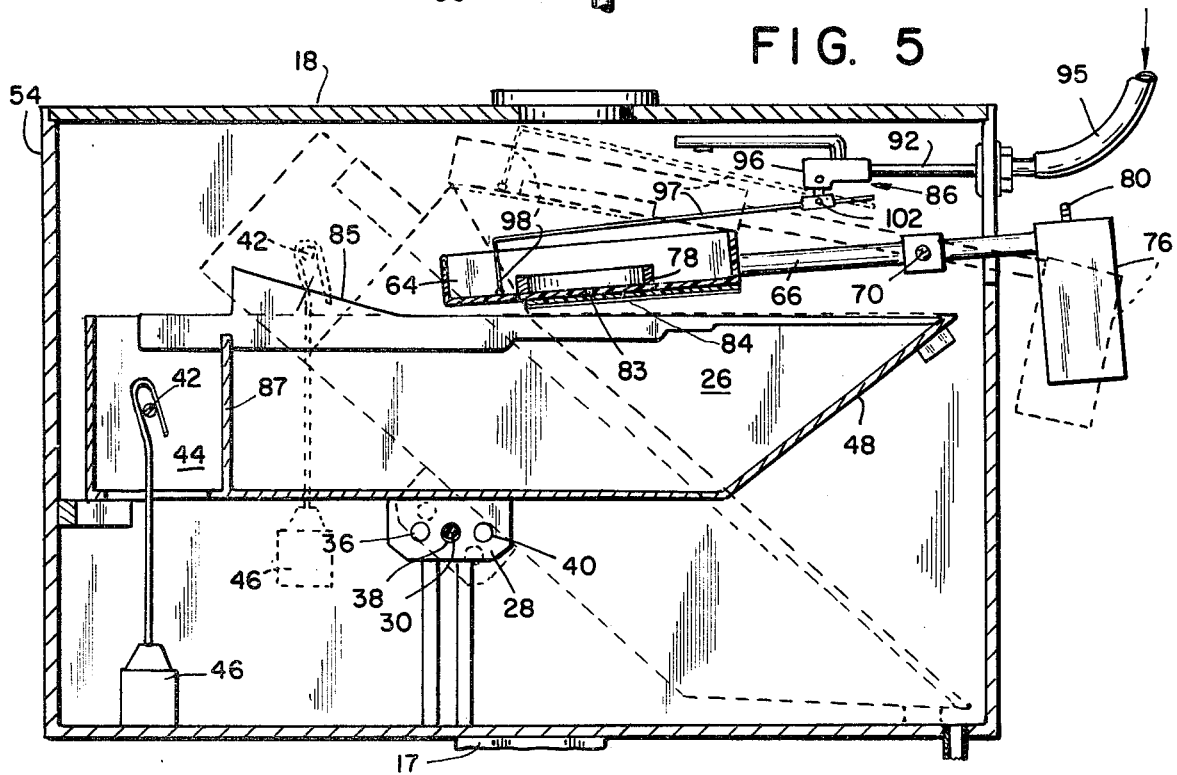
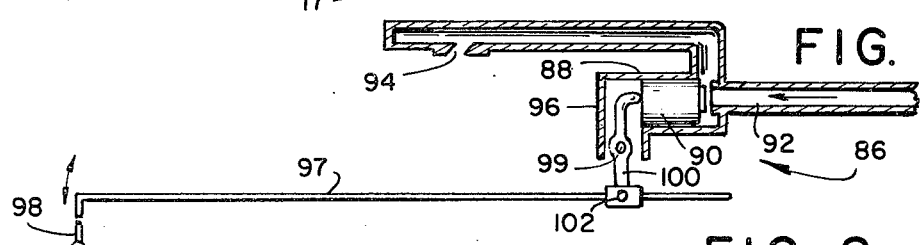
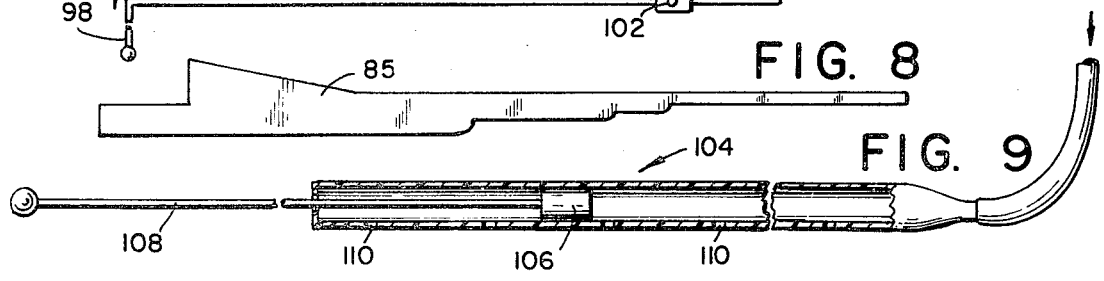

WATER GRAVITY PLANT FEEDER

BACKGROUND OF THE INVENTION

The invention relates to devices for feeding water to plants in general and in particular to an automatic water gravity plant feeder, a water bottle supply or tap water.

An object of the invention is to provide a water gravity plant feeder which will automatically dispense water at predetermined intervals and amounts to one or a plurality of plants.

Another object of the invention is to provide a device of the above character which is operated by water gravity.

A further object of the invention is to provide an automatic water gravity plant feeder provided with means for presetting the amounts and intervals of gravity water feeding for an extended time period of obviate frequent attention usually required on the part of the plant owner.

These and other objects of the invention will become apparent from the following description in connection with the appended drawing illustrating a preferred embodiment of the invention. It is to be understood, however, that these are given by way of illustration and not of limitation and that changes may be made in the detail, construction, form and size of the parts, without affecting the scope of the invention sought to be protected.

In the drawings:

FIG. 1 is a perspective view of the device,

FIG. 2 is a rear elevation thereof,

FIG. 3 is an elevational cross-section of the device,

FIG. 4 is a cross-section taken on line 4—4 of FIG. 3,

FIG. 5 is a cross-section taken on line 5—5 of FIG. 3,

FIG. 6 is an enlarged detail of the liquid dispensing mechanism of the device, shown in FIG. 4, FIG. 7 is a cross-sectional detail of a valve employed in the device, FIG. 8 illustrates the combination fork used in the device, FIG. 9 is a cross-section of the distributing tube of the device.

Referring now to the drawings in detail, the device according to the invention, generally indicated as 10, comprises a base 12 having a top wall 14 on which is detachably mounted a housing 16, positioned by means of a block 17 secured to the bottom of the housing and which fits into an opening 19 in the top wall 14.

As shown in the cross-sectional view of FIG. 3 the housing 16 is provided in its removable top wall 18 with a circular opening 20, into which fits the neck 22 of an inverted bottle 24 or 24'.

A tiltable water trough 26, provided with pivot plates 28, one of which is shown in FIG. 3, is mounted on a pivot rod 30 which is removably positioned transversely of frame members 32, 34. The pivot plates are provided each with aligned pairs of holes, such as 36, 38, 40, through each pair of which may be exchangeably inserted the pivot rod 30. By inserting the pivot rod in a desired pair of pivot holes, the amount of water required to tilt the trough 26 can be varied. Chamber 44 at the rear of the trough 26 has a hook for counterweight 46, which is designed to balance the trough. The counterweight rests on the bottom of the housing and does not engage with pivot 42 until the trough starts tilting downward, as shown in FIG. 3. in dotted lines, due to the excess of water over the level shown in a solid line in that Figure. It will be noted that the trough is formed with an inclined forward wall 48, so that the weight of the water in the forward part of the container is greater than the volume and weight of the water in the posterior part thereof. Thus, when the water exceeds a certain level above a preset one, the weight of the water in the forward part of the trough exceeds the weight of the water in the posterior part and causes the trough's forward part to tilt downwardly into the position shown by dotted lines in FIG. 3. The water will spill from the trough into sump 50, located at the bottom of housing 16. The sump 50 is formed by the lower portions of housing's front wall 52, rear wall 54, and side walls 56, 58. Water from the sump is supplied to the plants through either or both water outlets 60, 62 in a manner to be further described.

The periodic control of the water supply to the trough 26 is effected by a mechanism comprising an inner tray 64 secured to a nozzle 66 extending through slot 67, provided with a collar 68 and swingable by means of a rod 70 secured to collar 68, on supports 72, 74. The forward end of the tube is provided with an evaporation tray 76 which communicates with inner tray 64 trough tube 66. Integrally secured to the bottom of inner tray 64 is a sealing ring 78, which serves to shut off the flow of water to the trough 26 from bottle 24 shown in FIG. 2, or bottle 24' shown in FIG. 1, when the trough arrives into the position shown in dotted lines in said Figure. The evaporation tray 76 is provided with an adjustable weight 80 displaceable on threaded rod 82. Inner tray 64 has a slide valve 84 on its under surface 83, which may open or close passage from the inner tray, of water, depending on whether a water bottle or hose connection to a water faucet is employed to operate the device. The inner tray is slidably mounted on a supporting slide or "fork" 85 which is reversibly securable to the partition 87 of the trough, depending on whether water is supplied from a bottle or faucet, as will be described further.

For continuous automatic replenishment of water supply to the plant feeder from a water faucet, there is provided a valve mechanism 86 comprising a cylinder 88, a piston 90, displaceable in the cylinder, a water inlet tube 92, an outlet part 94 and an open chamber 96. The mechanism 86 may be secured to housing 16 by attaching inlet pipe 92 to the front wall 52 as shown in dotted lines in FIG. 5, and connecting the inlet pipe 92 by means of hose 95 to a water faucet. To operate the valve, there is provided a rod 97, pivotable on a bracket 100. The rod has a rear bent end 98 which rests on the bottom of inner tray 64. Thus, when inner tray 64 moves up into the position shown in dotted lines in FIG. 5, the piston 90 will be moved by the rod and close off the inlet tube 92, thus shutting off the water supply.

The supply of water to plants is effected through a distributor 104, connected to outlet 60. The distributor comprises a piston 106 slidable by means of a rod 108, secured to the piston. The piston closes off or opens a desired number of holes 110 in the tube, for watering a predetermined number of plants.

The distributor 104 is movable forward or backward on brackets 112, 112 a, for plants of various sizes. There is also provided a plurality of individual flexible tubes 114 with shut off valves 116.

BOTTLE FEEDING

The valve 84 on bottom of inner tray 64 has to be open. When apparatus is assembled, inner tray 64 will rest on combination fork 85 in tilted forward position.

Insert full water bottle and move evaporation tray 76 down. Another up and down movement may be required if evaporation tray 76 is not balanced. This will allow remaining water in inner tray 64 to move through nozzle 66 which connects inner tray 64 with evaporation tray 76 and will fill it almost full. Evaporation tray 76 will stay in down position, slightly backwards tilted, due to its water weight. Inner tray 64 with its water-filled ring, will seal up opening of neck 22 of the inverted bottle 24 hermetically, and stop waterflow immediately.

Nevertheless, water bottle 24 will occasionally release some water, since water pressure in bottle 24 is stronger than water pressure below the neck 22. The ring in inner tray 64 will reduce occasional water flow from bottle to a minimum of less than ½ cup of water within the water release period. This excessive water has to escape through the opened valve 84 into trough, instead of through nozzle.

Evaporation takes place in evaporation tray 76, according to room temperature, slower or faster. At an average room temperature of 76° F., water release will take place in approximately 3 days. At an average temperature of 70 degrees water release will take place in approximately 4 days.

The adjusting wheel 80 in evaporation tray 76 can be turned left or right on the threaded rod. By having the wheel on the right side position, water release to plants can be prolonged for about 1 day between each release. This adjusting wheel 80 is mainly meant for bottle feeding and will also "stretch" water supply for a few days during the overall watering period.

When evaporation tray 76 is nearly empty, it will move up, inner tray 64 will pivot down and water will be released from bottle 24 into inner tray 64. When water level in trough reaches the amount of water that was preset, trough will tilt and spill water into sump. Simultaneously slide or fork 85 will force inner tray 64 to slide up along the fork and as inner tray 64 reaches the nozzle neck, water flow from nozzle 24 will stop immediately. The remaining portion of water in inner tray 64 will rush through nozzle 66 and re-fill the evaporation tray. Evaporation will again take place, as above.

Water bottles could be turned conveniently to show the respective capacity on the amount of water to be released by the trough.

PERPETUAL FEEDING BY USING WATER HOSE

Slide valve 84 on bottom of inner tray 64 has to be closed.

When aparatus is assembled, inner tray 64 will rest on combination fork 85 in tilted forward position. Adjusting wheel 80 on evaporation tray 76 to be turned to right side before attaching valve mechanism 86 in slot of the housing.

Valve 86 easily attaches and adjustes in a slot on the front wall of the housing by means of a "knob type" screw and a nut. Water gushing from the open faucet is directed to flow into inner tray 64, filling it up and move evaporation tray 76 down. This will allow water in inner tray 64 to move through nozzle 66 which connects inner tray with evaporation tray 76 and will fill it up. Evaporation tray 76 will stay in down position, slightly backwards tilted due to its water weight. Simultaneously valve 86 is aparatus is being shut off due to the action of rod 97 on piston 90, causing water flow to shut off. Inner tray 64 stays in slightly backward tilted position. (In shut off position).

In approximately 3 days, when evaporation time is over, evaporation tray 76 will move up and inner tray 64 will move down. The rear end of the rod 97 will also move down and open the valve. Water will flow into inner tray 64 and overflows into trough. When water level in trough reaches the amount of water that was preset, trough will tilt and spill water into the sump. Simultaneously combination fork 85 will force inner tray 64 to slide up along combination fork which will cause extended arm 97 to move up rapidly and shut off water flow. Water from inner tray 64 will rush through nozzle 66 into evaporation tray 76 and evaporation cycle will continue.

Since the slide valve on the bottom of inner tray 64 is closed, a slightly larger amount of water will rush into the evaporation tray. (On a bottle feeding there is less water weight required in evaporation tray 76 hence the slide valve is always open).

It should be noted that the same fork 85 is used for both systems. One side is built lower, the other side higher. Fork is to be mounted properly to match its respective water supplies by reversing it. For a 1-quart setting it is adviseable to unscrew the bottom part of counterweight 46 and center piece to be removed.

I claim:

1. A water gravity plant feeder, comprising, in combination, a base; a housing mounted on said base having a top wall provided with an opening wherein is a neck of an inverted water containing bottle, a front wall having a vertical slot, a rear wall, side wall and a bottom wall; a first valve for closing and opening the neck of said bottle, said first valve comprising a tube pivoted between said side walls and extending outwardly forward of the front wall through said slot with one end; an evaporation tray secured to said one end; an inner tray secured to the tube's other end positioned below said opening and provided with a sealing ring for closing the neck of said bottle; a trough mounted pivotably beneath said inner tray; a sump positioned in said housing below said trough; water from said bottle entering said inner tray, said tube, said evaporation tray and spilling over into said through and accumulating in said through; said valve and said trough being actuated in response to said evaporation tray becoming lighter, due to the evaporation within said tray; first water distributing means, secured to said front wall, for watering plants, and second water distributing means for watering plants, secured to the rear wall, both said distributing means communicating with said sump.

2. The plant feeder as claimed in claim 1, wherein said housing is provided with a pair of spaced vertical supports, said inner tray being pivotably mounted intermediate said supports, a nozzle secured with one end to said tray and extending outwardly of the housing through a slot in said front wall, an evaporation tray secured to the other end of said nozzle.

3. The plant feeder as claimed in claim 2, wherein said trough is formed with an inclined forward wall, a pair of adjusting plates secured to said trough, said plates having a plurality of pivot holes for selective adjustment of the water level in said trough, a counterweight engageable with said trough for balancing the trough and means for engaging said counterweight when said trough is tilted upwards.

4. The plant feeder according to claim 3, wherein said evaporation tray is provided with adjustable weight means for balancing said inner tray.

5. The device as claimed in claim 4, wherein said top of the housing is provided with an aperture above said inner tray, said water supply means consisting of an inverted water filled bottle having a neck receivable in said aperture.

6. The plant feeder as claimed in claim 4, wherein said first distributing means comprises a rigid tube, said tube having a plurality of spaced drip holes and communicating with said sump, adjustable bracket means for supporting said tube horizontally on said base and a piston slidable in said tube for closing off a selected number of said drip holes.

7. The plant feeder as claimed in claim 4, wherein said second distributing means comprises a plurality of tubes of flexible material means communicating one end of each of said tubes with said sump, shut-off valves for each of the respective of said tubes, nozzles secured to the other ends of said tubes and a bracket for supporting said free ends of the tubes.

8. The feeder as claimed in claim 4, further provided with a fork for slidably supporting said inner tray.

9. The feeder as claimed in claim 4, said tray having a bottom provided with an opening and a slidable valve for opening and closing said opening.

10. A Water gravity plant feeder, comprising, in combination, a base; a housing mounted on said base and having a removable top wall, a front wall provided with a vertical slot, a rear wall, side walls and a bottom wall; a tube pivoted between said side walls and extending outwardly of the front wall through said vertical slot with one end; an evaporation tray secured to said one end; an inner tray secured to said tube's other end; a trough mounted pivotably beneath said inner tray; a sump positioned in said housing below said trough; water supply means for said inner tray, said tube, said evaporation tray; said water supply means comprising a second valve adapted for connection to a water faucet and secureable to said front wall for supplying water to the inner tray, wherein water spilling over said inner tray accumulates in said trough; means for operating said second valve; said means comprising a rod having one end operably connected to said second valve and having a bent other end abutting the bottom of the inner tray, said rod being pivotable on a bracket secured to said second valve; said second valve and said trough being actuated in respose to said evaporation tray becoming lighter, due to the evaporation within said tray; first water distributing means, secured to said front wall, for watering plants, and second water distributing means for watering plants, secured to the rear wall, for watering plants, both said distributing means communicating with said sump.

* * * * *